(12) United States Patent
Smith

(10) Patent No.: US 11,806,824 B2
(45) Date of Patent: Nov. 7, 2023

(54) ROUTER AND DEBRIS RECEPTACLE

(71) Applicant: Jessem Tool Corporation, Moncton (CA)

(72) Inventor: Darrin E. Smith, New Brunswick (CA)

(73) Assignee: Jessem Tool Corporation, Moncton (CA)

( * ) Notice: Subject to any disclaimer, the term of this patent is extended or adjusted under 35 U.S.C. 154(b) by 262 days.

(21) Appl. No.: 16/952,148

(22) Filed: Nov. 19, 2020

(65) Prior Publication Data

US 2022/0152766 A1 May 19, 2022

(51) Int. Cl.
| | | |
|---|---|---|
| *B23Q 11/00* | (2006.01) | |
| *B23D 59/00* | (2006.01) | |
| *A47L 9/16* | (2006.01) | |
| *A47L 7/00* | (2006.01) | |
| *B23Q 11/10* | (2006.01) | |
| *B23Q 11/12* | (2006.01) | |

(52) U.S. Cl.
CPC ........ *B23Q 11/0046* (2013.01); *A47L 9/1691* (2013.01); *B23D 59/006* (2013.01); *A47L 7/0095* (2013.01); *A47L 9/1683* (2013.01); *B23Q 11/0071* (2013.01); *B23Q 11/1092* (2013.01); *B23Q 11/127* (2013.01)

(58) Field of Classification Search
CPC ......... B27C 5/02; B27C 5/04; B23Q 11/0042; B23Q 11/0046; B23Q 11/0067
See application file for complete search history.

(56) References Cited

U.S. PATENT DOCUMENTS

| | | | | |
|---|---|---|---|---|
| 4,742,885 A | * | 5/1988 | Tidwell ................. | B62K 21/02 180/219 |
| 8,800,682 B2 | * | 8/2014 | Walker .................... | B24B 55/10 173/198 |
| 9,937,599 B1 | * | 4/2018 | Holleman .......... | B23Q 11/0046 |

FOREIGN PATENT DOCUMENTS

GB  2585475 A * 1/2021 ........... B23D 59/006

* cited by examiner

*Primary Examiner* — Matthew Katcoff
(74) *Attorney, Agent, or Firm* — Stinson LLP

(57) ABSTRACT

A debris receptacle for a router table includes an enclosure configured to be attached to the router table. The enclosure defines an interior sized and shaped to receive a router. The enclosure defines a debris inlet aperture in fluid communication with a router bit aperture of the work platform so that the interior receives the debris from router bit aperture via the debris inlet aperture. The enclosure also defines a debris outlet aperture in fluid communication with a dust collector to remove debris from the interior. The enclosure further defines an air inlet aperture in fluid communication with air in an environment outside the enclosure. The debris receptacle also includes an air intake conduit for fluidly coupling the air inlet aperture to an air inlet of the router, thereby enabling the router to draw air into the router from the environment outside the enclosure to cool the router.

15 Claims, 7 Drawing Sheets

ROUTER AND DEBRIS RECEPTACLE

FIELD

The present disclosure generally relates to routers and debris collection for woodworking tools and more specifically to a debris receptacle and router usable therewith.

BACKGROUND

Router tables are commonly used to mount a router beneath the work platform of the table. The bit of the router extends or projects through an opening (e.g., router bit aperture) in the work platform and cuts the work piece (e.g., lumber) which rests on the work surface of the work platform. The router generates a significant amount of debris. Attempts to capture the debris have led to fouling and premature failure of the router.

SUMMARY

In one aspect, a debris receptacle for a router table having a work platform and a router suspended below the work platform comprises an enclosure configured to be attached to the router table. The enclosure defines an interior sized and shaped to receive the router to generally enclose the router within the enclosure when the enclosure is attached to the router table. The enclosure defines a debris inlet aperture, a debris outlet aperture and an air inlet aperture. The debris inlet aperture is in fluid communication with the interior. The debris inlet aperture is configured to be in fluid communication with a router bit aperture of the work platform so that the interior receives debris from router bit aperture via the debris inlet aperture. The debris outlet aperture is in fluid communication with the interior. The debris outlet aperture is configured to be in fluid communication with a dust collector to remove debris from the interior. The air inlet aperture is in fluid communication with air in an environment outside the enclosure. An air intake conduit is configured to connect to the router. The air intake conduit defines an air intake passageway configured to be fluidly coupled to the air inlet aperture and configured to be fluidly coupled to an air inlet of the router when the air intake conduit is connected to the router. The air intake conduit enables the router to draw air into the router from the environment outside the enclosure through the air inlet aperture and the air inlet passageway to cool the router.

In another aspect, a router for use with a router table to cut workpieces comprises an electric motor. A housing contains the electric motor and has first and second opposite ends. A shaft is operatively connected to the electric motor for being rotated by the electric motor. A chuck is mounted on the shaft. The chuck is located adjacent the first end of the housing and is configured for releasably attaching router bits to the shaft. The housing has a cooling air port defining a cooling air port opening into the housing at a location for supplying cooling air to the electric motor. The cooling air port is disposed toward the second end of the housing from the chuck and is configured to sealingly receive a hose for drawing cooling air from a location remote from the housing.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
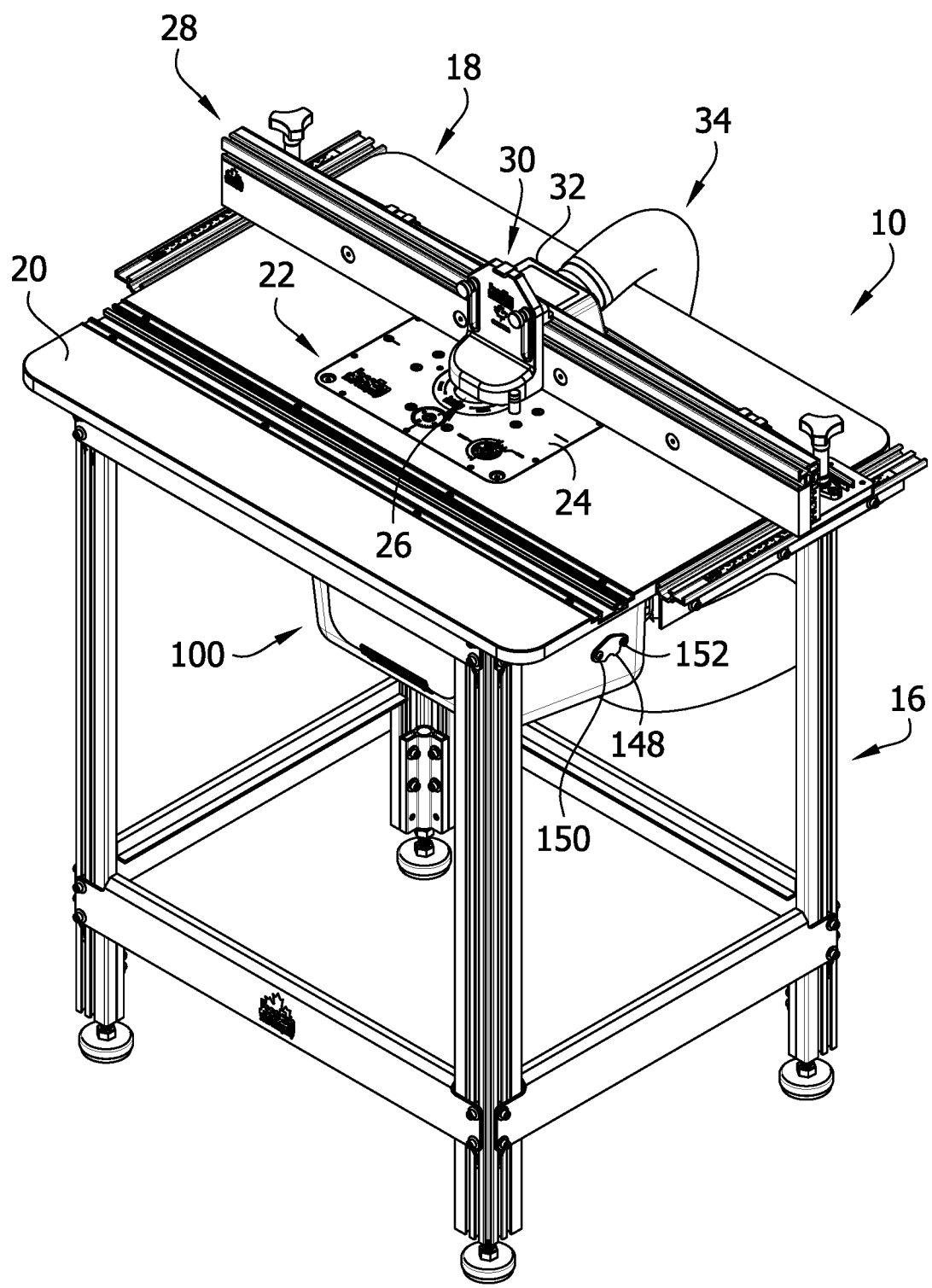
FIG. 1 is a front perspective of a router table with a debris receptacle according to one embodiment of the present disclosure attached thereto.
Figure 2:
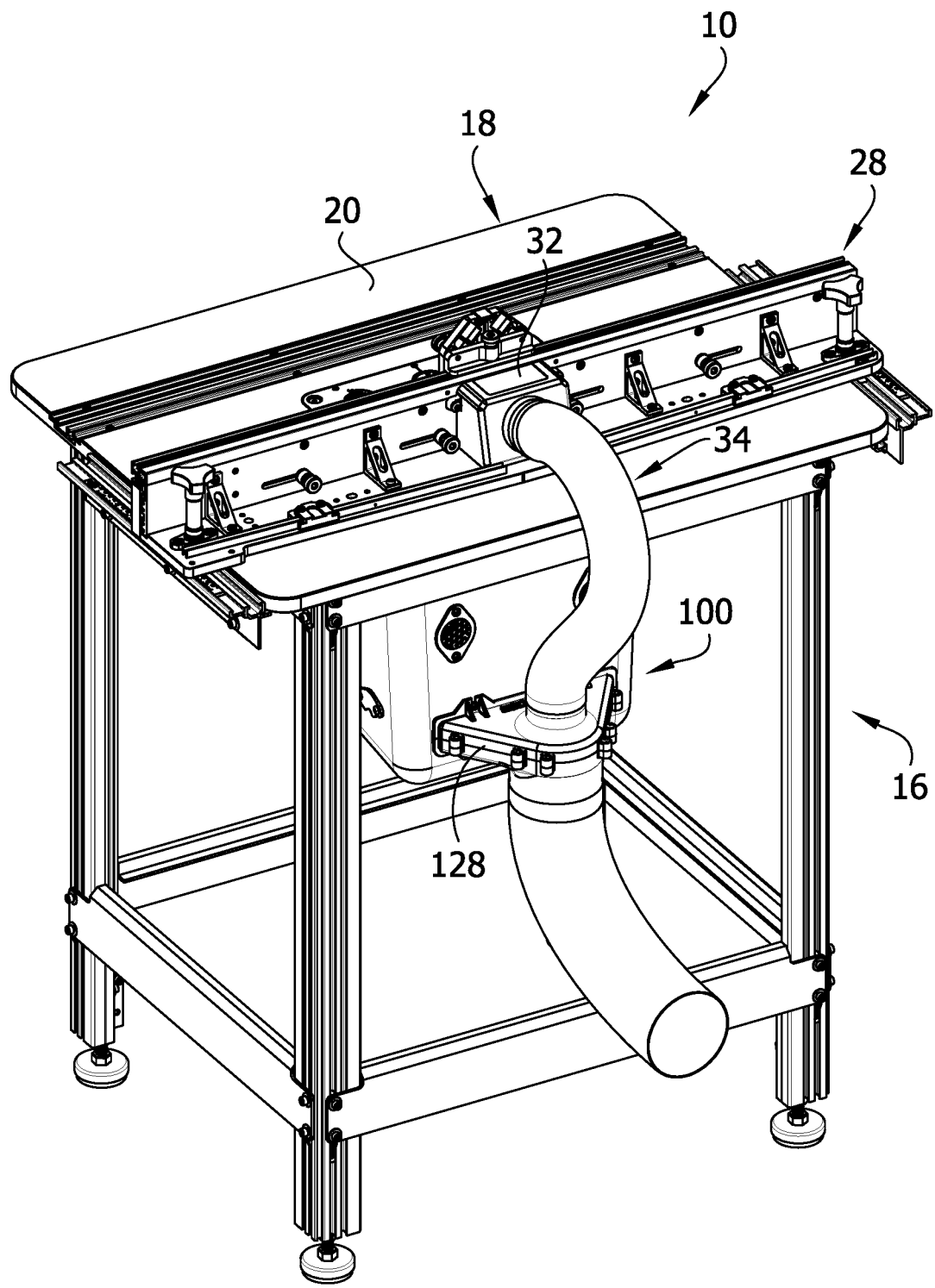
FIG. 2 is a rear perspective of the router table.

Referring to FIGS. 1 and 2, a debris receptacle (e.g., dust receptacle) for collecting debris generated by a power tool working (e.g., cutting, shaping, trimming, etc.) a work piece (not shown) is generally indicated at reference numeral 100. The debris may include dust, shavings, etc. removed from a work piece by the power tool. In the illustrated embodiment, the debris receptacle 100 is configured for use with a router table 10 (broadly, a work table) for collecting debris generated by a router 12 (FIG. 3), although it is understood that the debris receptacle may be configured for use with other work tables and power tools (e.g., a table saw). The router table 10 includes a frame 16 supporting a work platform 18. The work platform has a work surface 20 on which the work piece is placed and moved over in order to have the work piece shaped (e.g., cut) by a router bit (not shown) (broadly, a cutting element or working element) connected to the router 12. The router table 10 includes a router lift 22 supporting the router 12. The router lift 22 suspends the router 12 below the work platform 18 and allows a user to move the router to a selected vertical position to vertically position the router bit relative to the work surface 20. The router lift 22 includes a plate 24 which forms part of the work platform 18 (e.g., work surface 20). The plate 24 defines a working or router bit aperture 26. The router bit extends up out of the router bit aperture 26 so the router bit can engage the work piece on the work surface 20. Further details on router lifts 22 may be found in U.S. Pat. No. 9,039,000, the entirety of which is hereby incorporated by reference. The router lift 22 is hidden from view in FIGS. 3-6 to reveal interior details. The router table 10 may also include a table fence 28 configured to brace and position the work piece on the work surface 20 relative to the router bit. The table fence 28 may include a guard 30 (shown partially covering the router bit aperture 26) to protect the user from the router bit and a debris (e.g., dust) port 32 for connection to a debris (e.g., dust) hose 34 for removing debris from the work surface 20. Work tables (e.g., router tables) having other configurations are within the scope of the present disclosure.

Referring to FIGS. 3-6, the router 12 includes an electric motor 40 within a housing 42. The housing 42 has opposite first and second ends. The router 12 includes a shaft 44 operatively connected to the electric motor 40 for being rotated by the electric motor. A chuck 46 is mounted on the shaft 44. The chuck 46 is configured to releasably attach to router bits (not shown), thereby attaching the router bits to the shaft 44. Accordingly, rotation of the shaft 44 by the motor 40 rotates the chuck 46 and the router bit secured thereto for working (e.g., cutting) a work piece. The chuck 46 is located adjacent the first end of the housing 42. The chuck 46 is aligned with the router bit aperture 26 when the router 12 is supported by the router lift 22. The housing 42 includes a first (broadly, at least one) cooling air port opening or aperture 48 (FIG. 6) into the housing at a location for supplying cooling air to the electric motor 40. The housing 42 includes a first cooling air port 50 that defines the first cooling air port opening 48. The first cooling air port 50 is disposed toward (e.g., adjacent) the second end of the housing 42 from the chuck 46. The first cooling air port 50 is configured to sealingly connect to a first air intake conduit (e.g., hose) 140 for drawing cooling air from a location remote from the housing 42. As will become apparent, the location remote from the housing is outside the debris receptacle 100. In the illustrated embodiment, the housing 42 includes a second cooling air port 54 that is generally identical to the first cooling air port 50. The second cooling air port 54 defines a second cooling air port opening or aperture (not shown) into the housing 42 at a location spaced from the first cooling air port 50 for supplying cooling air to the electric motor 42. In the illustrated embodiment, the first and second cooling air ports 50, 54 are disposed on generally opposite sides of the housing 42. The second cooling air port 54 is also disposed toward (e.g., adjacent) the second end of the housing 42 from the chuck 46. The second cooling air port 54 is configured to sealingly connect to (e.g., receive) a second air intake conduit (e.g., hose) 140 for drawing cooling air form a location remote from the housing 42. Again, the location remote from the housing is outside the debris receptacle 100. In the illustrated embodiment, the first and second cooling air ports 50, 54 (e.g., cooling air port openings) are generally circular in shape so that they are configured to accept round conduits. Other configurations of the cooling air ports are within the scope of the present disclosure. The router 12 includes a power or electric cable 56 for supplying power to the electric motor 40. Other configurations of the router are within the scope of the present disclosure.

Referring to FIG. 1-7, the debris receptacle 100 is configured to be attached to the router table 10. The debris receptacle 100 includes an enclosure 102. The enclosure 102 defines an interior 104 sized and shaped to receive the router 12 to generally enclose the router within the enclosure when the enclosure is attached to the router table 10. The interior 104 is also sized and shaped to receive a lower portion of the router lift 22 that suspends the router 12 below the work platform 18. The interior 104 has a height sufficient to allow the router 12 to be moved vertically (e.g., up and down) within the enclosure 102 by the router lift 22. In the illustrated embodiment, the enclosure 102 includes a bottom wall 106, opposite front and rear walls 108, 110, and opposite left and right side walls 112, 114. The front and rear walls 108, 110 extend generally upward from the bottom wall 106. The front wall 108 extends slightly forward as the front wall extends upward from the bottom wall 106 to help direct debris toward the rear of the enclosure 102. The bottom wall 106 also slants downward as the bottom wall extends rearward, from the front wall 108, to help direct debris toward the rear of the enclosure 102. The orientation of the front and bottom walls 108, 106 directs debris in the interior toward a debris outlet aperture 126, discussed in more detail below, disposed at the rear of the enclosure 102. The left and right side walls 112, 114 extend generally upward from the bottom wall 106 and between the front and rear walls 108, 110. In the illustrated embodiment, the enclosure 102 includes a door 116 configured to permit access to the router 12 when the router is disposed in the interior 104 of the enclosure. The door 116 is connected to the front wall 108. The door includes a knob 118 and can be opened to provide access to the interior 104 of the enclosure 102. The enclosure 102 is configured to be attached to the router table 10, as shown in FIGS. 1 and 2. In the illustrated embodiment, the enclosure 102 includes a peripheral rim 120 for attaching the debris receptacle 100 (e.g., enclosure 102) to the router table 10. The peripheral rim 120 extends around the upper edges of the front, rear, left side and right side walls 108, 110, 112, 114. The peripheral rim 120 is configured to engage an underside of the work platform 18. The peripheral rim 120 defines one or more fastener openings 122 sized and shaped to receive fasteners (not shown), such as screws, to mount the enclosure 102 to the work platform 18. Other ways of securing the debris receptacle 100 to the router table 10 are within the scope of the present disclosure.

Referring to FIGS. 3-7, the enclosure 102 defines a debris inlet aperture 124 in fluid communication with the interior 104. The debris inlet aperture 124 is disposed at the upper end of the interior 104 (e.g., the interior has an open upper end). In the illustrated embodiment, the debris inlet aperture 124 is generally defined by the peripheral rim 120 (e.g., upper edges of the walls 108, 110, 112, 114) of the enclosure 102. The debris inlet aperture 124 is configured to be in fluid communication with the router bit aperture 26 of the work platform 18 so that the interior 104 receives the debris from the router bit aperture via the debris inlet aperture. When the enclosure 102 is mounted to the work platform 18, the debris inlet aperture 124 is aligned with and underlies the router bit aperture 26 so that the interior 104 receives any debris that falls through the router bit aperture. In addition, the router 12 (e.g., chuck 46) and/or router bit may extend through the debris inlet aperture 124 into the router bit aperture 26.

The enclosure 102 also defines a debris outlet aperture 126 in fluid communication with the interior 104. The debris outlet aperture 126 is configured to be in fluid communication with a dust collector (not shown) to remove debris from the interior 104. Dust collectors are generally known in the art and use suction to draw debris away from one location (e.g., router 12) and into a debris collector (e.g., bin, trash can, bag, etc.) using a system of conduits or hoses. The enclosure 102 includes a debris collection port 128 defining the debris outlet aperture 128. The debris collection port 128 is configured to be coupled to a dust collection system (of which the dust collector is part of) to fluidly couple the interior 104 to the dust collection system via the debris outlet aperture 126. In the illustrated embodiment, the dust collection system includes a debris hose 36 connected to the debris collection port 128. The dust collector draws debris out of the interior 104 of the enclosure 102 and into the debris hose 36 via the debris outlet aperture 126. In the illustrated embodiment, the debris collection port 128 is also configured to couple to a secondary debris collection system so that the secondary debris collection system is fluidly coupled to the dust collection system (e.g., the dust collector). Specifically, the debris collection port 128 is configured to couple to two debris hoses 34, 36. In the illustrated embodiment, the secondary debris collection system includes the debris hose 34 and the debris port 32 that removes debris from the work surface 20. Other configurations of the secondary debris collection system are within the scope of the present disclosure. In the illustrated embodiment, the debris collection port 128 is mounted to the rear wall 110.

In the illustrated embodiment, the debris outlet aperture 126 is disposed adjacent the bottom wall 106 of the enclosure to facilitate the removal of the debris from the interior 104. As mentioned above, the orientation of the front wall 108 and the rear wall 106 generally direct or funnel debris toward the debris outlet aperture 126. The debris outlet aperture 126 has a generally rectangular shape with a width that is greater than its height. Preferably, the width of the debris outlet aperture 126 is greater than 50% of a width of the interior 104 to facilitate the removal of the debris from the interior. Other configurations of the debris outlet aperture 126 are within the scope of the present disclosure.

The enclosure 102 defines at least one air inlet aperture 130. In the illustrated embodiment, the enclosure 102 defines two air inlet apertures 130 which are generally identical to one another, although more or fewer air inlet apertures are within the scope of the present disclosure. Each air inlet aperture 130 is in fluid communication with air in an environment outside the enclosure 102. As explained in more detail below, air from the environment outside the enclosure 102 is drawn through each air inlet aperture 130 to cool the electric motor 40 of the router 12. In the illustrated embodiment, each air inlet aperture 130 is disposed above the debris outlet aperture 126. In other words, the debris outlet aperture 126 is closer to the bottom wall 106 of the enclosure 102 than the air inlet apertures 130. The air inlet apertures 30 could be located in other places and such other places are within the scope of the present disclosure. The enclosure 102 includes air inlet ports 132, each air inlet port defining one of the air inlet apertures 130. In the illustrated embodiment, each air inlet port 132 (e.g., air inlet aperture 130) has a generally circular shape. Each air inlet port 132 is mounted on the rear wall 110. In one embodiment, each air inlet port 132 may include a filter (not shown) to filter the air as the air is drawn through the air inlet aperture 130.

Figure 4:
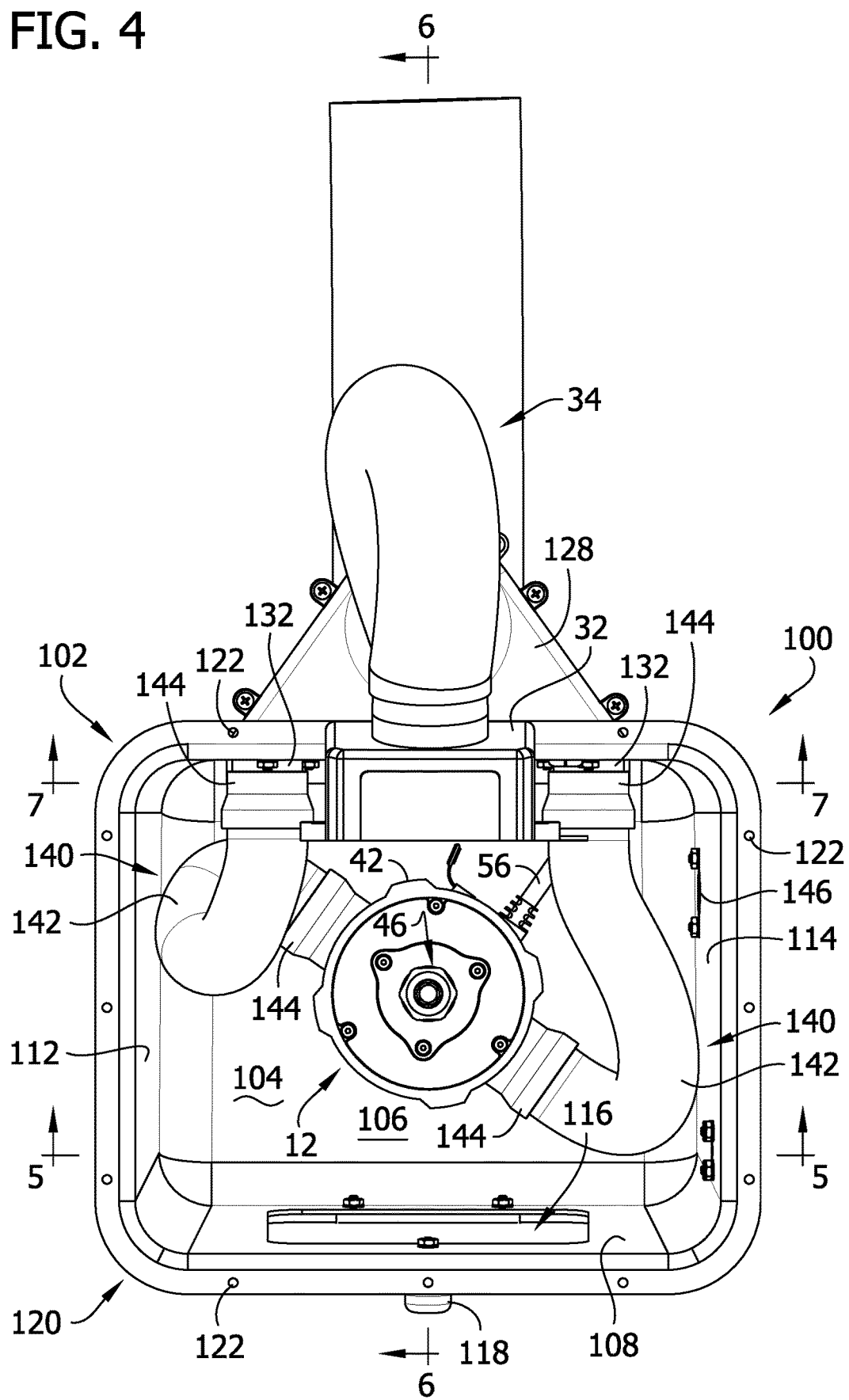
FIG. 4 is a top view of the debris receptacle and router.
Figure 5:
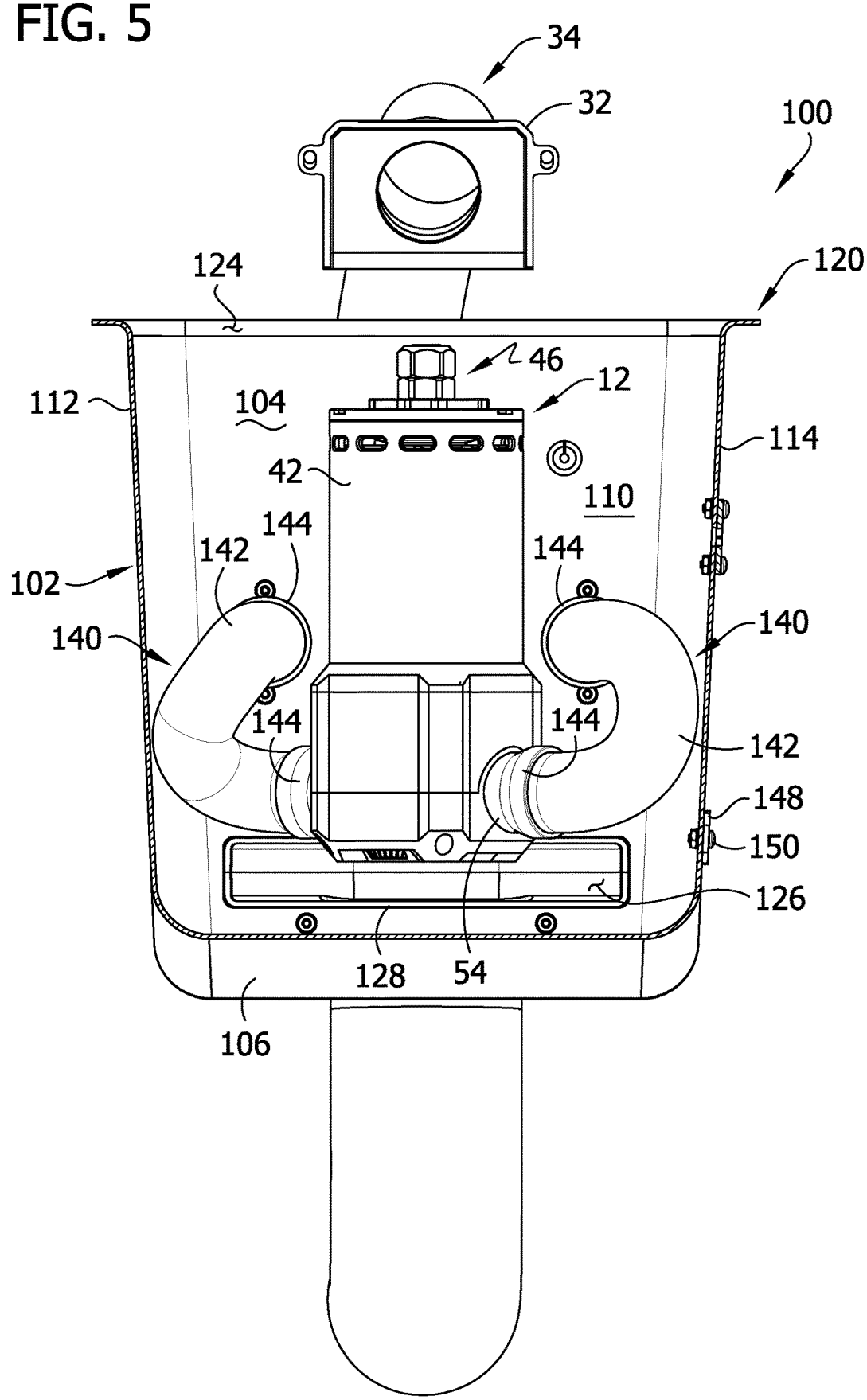
FIG. 5 is a section of the debris receptacle taken through line 5-5 of FIG. 4.
Figure 6:
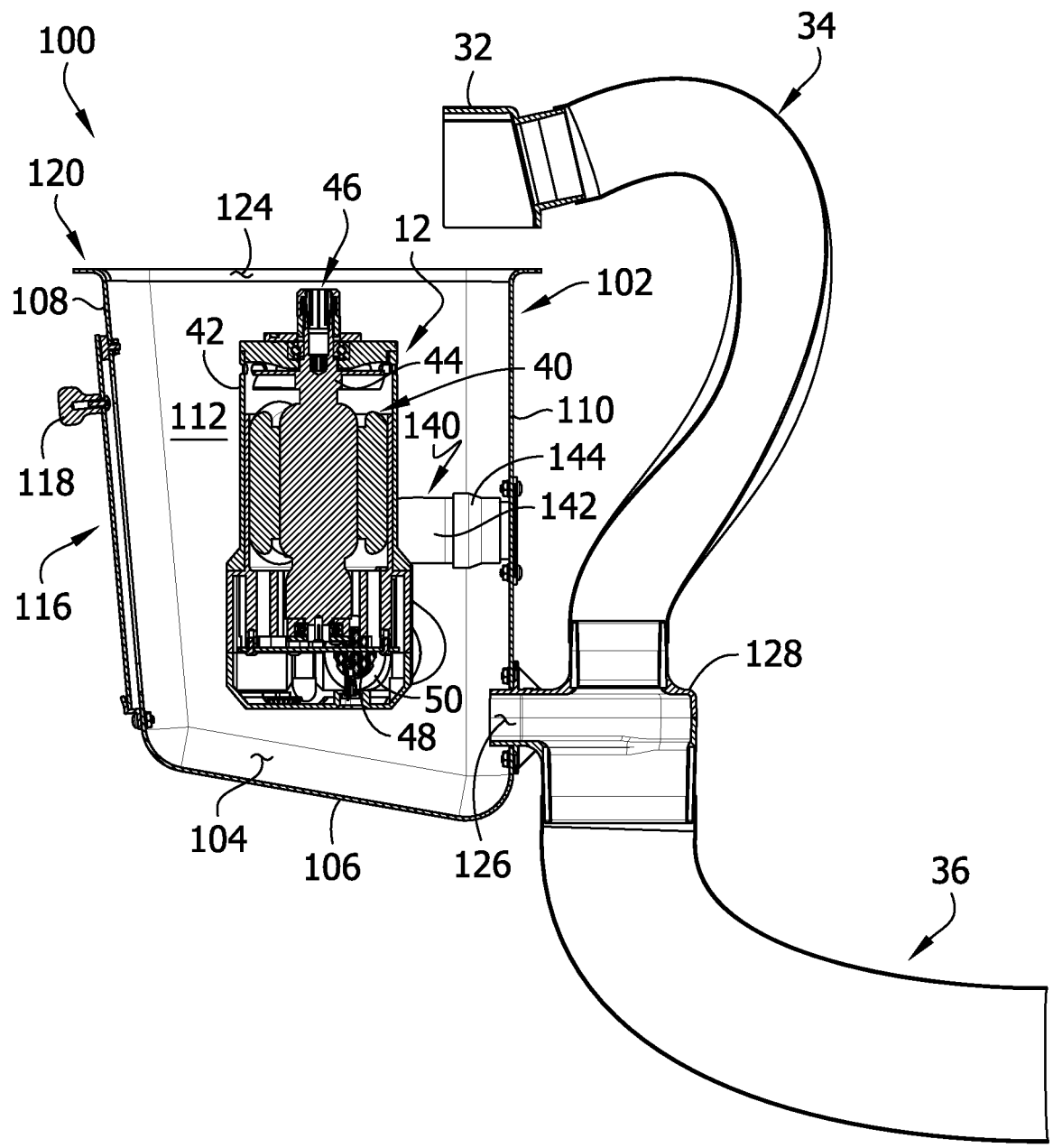
FIG. 6 is a section of the debris receptacle taken through line 6-6 of FIG. 4.
Figure 7:
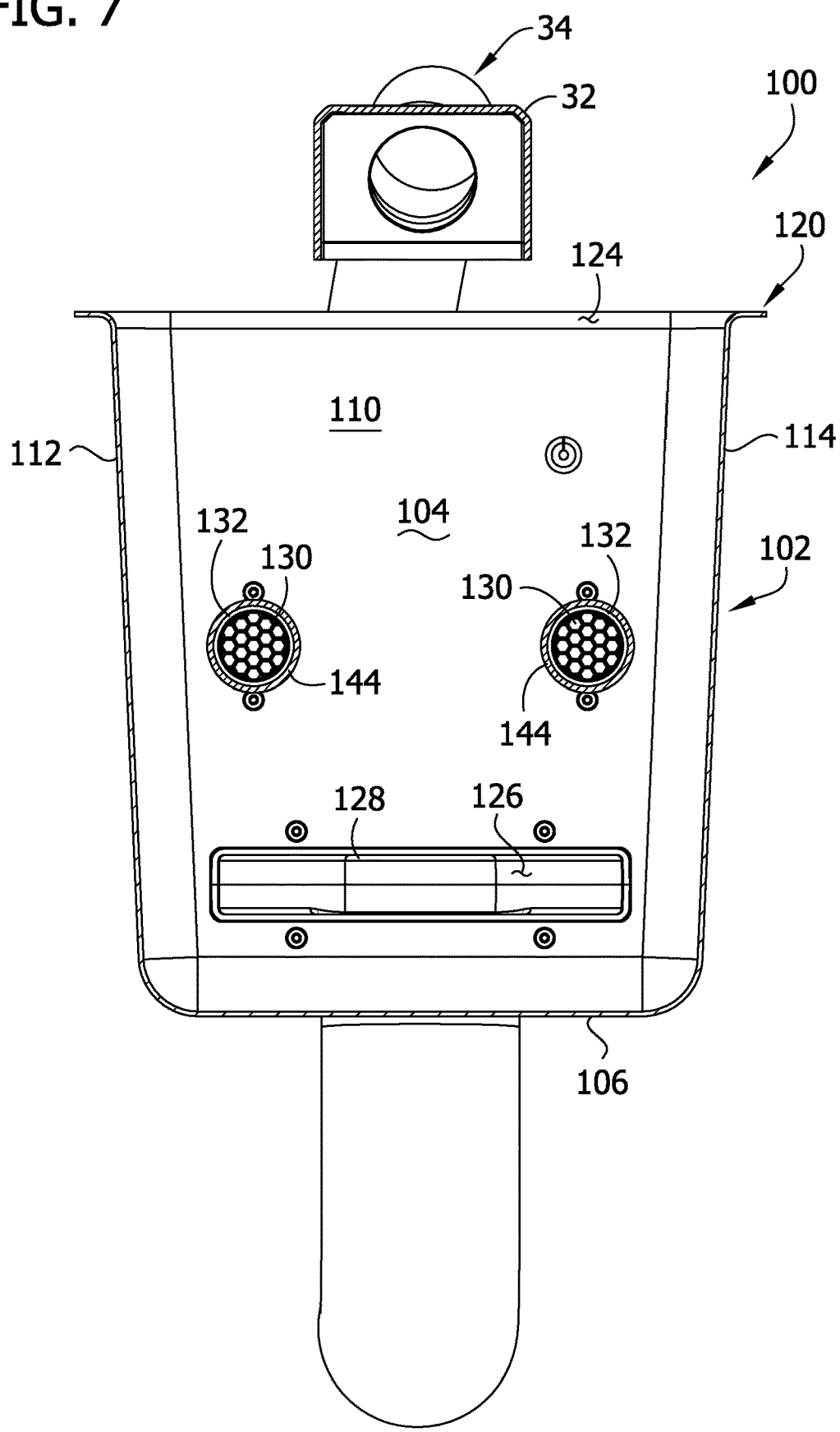
FIG. 7 is a cross-sectional view of the debris receptacle taken through line 7-7 of FIG. 4.

Referring to FIGS. 4-6, the debris receptacle 100 includes at least one air intake conduit 140. Each air intake conduit 140 fluidly couples the router 12 to the air in the environment outside the enclosure 102. Each air intake conduit 140 enables the router 12 to draw air from a location remote from the router (e.g., interior 104). In the illustrated embodiment, the debris receptacle 100 includes two air intake conduits 140, although more or fewer air intake conduits are within the scope of the present disclosure. The two air intake conduits 140 are generally identical. According, one air intake conduit 140 will now be described with the understanding the other air intake conduit has essentially the same construction. The air intake conduit 140 connects the router 12 to one of the two air intake ports 132. The air intake conduit 140 includes a hose 142 with fittings 144 at either end. The hose 142 defines an air intake passageway or lumen (not shown) extending between the fittings 144. The air intake conduit 140 is configured to connect to the router 12. Specifically, one of the fittings 144 of the air intake conduit 140 is configured to sealingly connect to (e.g., receive) one of the cooling air ports 54 of the router 12. In other words, the air intake conduit 140 sealingly attaches to the cooling air port 54 of the router 12 so that air (e.g., cooling air) can be drawn from an end of the air intake conduit remote from the cooling air port into the housing 42 of the router 12 for cooling the electric motor 40. When the air intake conduit 140 is connected to cooling air port 54, the air intake passageway and the cooling air port aperture 48 are fluidly connected together. Likewise, the air intake conduit 140 is configured to be connected to one of the air inlet ports 132. Specifically, one of the fittings 144 (the fitting not connected to and remote of the router 12) of the air intake conduit 140 is configured to connect in a sealed manner to (e.g., receive) one of the air intake ports 132. When the air intake conduit 140 is connected to the air intake port 132, the air intake passageway and the air inlet aperture 130 are fluidly connected together. Accordingly, the air intake conduit 140 (e.g., air intake passageway) fluidly connects the router 12 (e.g., cooling air port aperture 48) to the air in the environment outside the enclosure (e.g., the air intake aperture 130). As a result, the air intake conduit 140 enables the router 12 to draw air into the router from the environment outside the enclosure 102 through the air inlet aperture 130 and the air inlet passageway to cool the router (e.g., the electric motor 40). Specifically, during the operation of the router 12, the router draws air from the outside environment through the air intake aperture 130, through the air intake passageway, through the cooling air port aperture 48 and into the housing 42 to cool the electric motor 40 (e.g., draws air through the air inlet port 132, the air intake conduit 140 and cooling air port 54). Once the air cools the electric motor 40, the air is exhausted from the router 12 into the interior 104 of the enclosure 102.

The air intake conduit 140 provides a pathway for the air from the outside environment that is sealed off from the interior 104, thereby inhibiting the router 12 from drawing air from the interior, unlike conventional dust receptacle configurations. In conventional dust receptacle configurations, the router draws air into its housing for cooling the electric motor directly from the interior of the dust receptacle. This results in the router drawing debris (e.g., dust and wood chips) from the interior into the motor, which can damage and/or cause premature failure of the motor. Moreover, conventional dust receptacle configurations result in reduced airflow through the router because the router is drawing air from the interior to cool the motor at the same time a dust collector is drawing air out the interior to collect the debris from the interior. This results in air being drawn in opposite directions, thereby reducing the amount of air flowing through the router and cooling the motor. This air flow starvation can lead to the motor overheating heating and becoming damaged or fail as a result. Furthermore, in conventional dust receptacle configurations, typically the router bit opening is the only opening through which new air can be drawn into the interior to replace the air being removed from the interior by the dust collector. Often the work piece covers the router bit opening, thereby preventing or severely restricting new air from flowing into the interior. This reduces the effectiveness of the dust collector at removing debris from the interior. This also causes the same air to recirculate through the router, heating up each time through, and thereby reducing the cooling capabilities provided by the air. This can further lead to motor overheating and premature motor failure.

The dust receptacle 100 of the present disclosure overcomes many of these deficiencies of conventional dust receptacles. The dust receptacle 100 enables the router 12 to draw in clean air from the environment outside the dust receptacle 100 to cool the electric motor 40. The air from the outside environment is cleaner than the air in the interior (e.g., does not contain debris from the work piece). In addition, by drawing air directly from the outside environment, the router 12 does not have to overcome the flow of air out of the interior 104 by the dust collector. Also, by continuously drawing air from the outside environment, the router 12 receives cooler air than in conventional configurations where air recirculates within the interior 104. Furthermore, in the illustrated embodiment, the router 12 exhausts the air drawn from the outside environment directly into the interior 104 of the enclosure 102, thereby at least partially compensating for any reduction in air flow due to the work piece covering the router bit aperture 26 during operation. As a result of these benefits, the performance of the router 12 is improved and the life of the router (e.g., electric motor 40) is prolonged. Moreover, the continuity of removal of debris from the enclosure 12 is improved.

Figure 3:
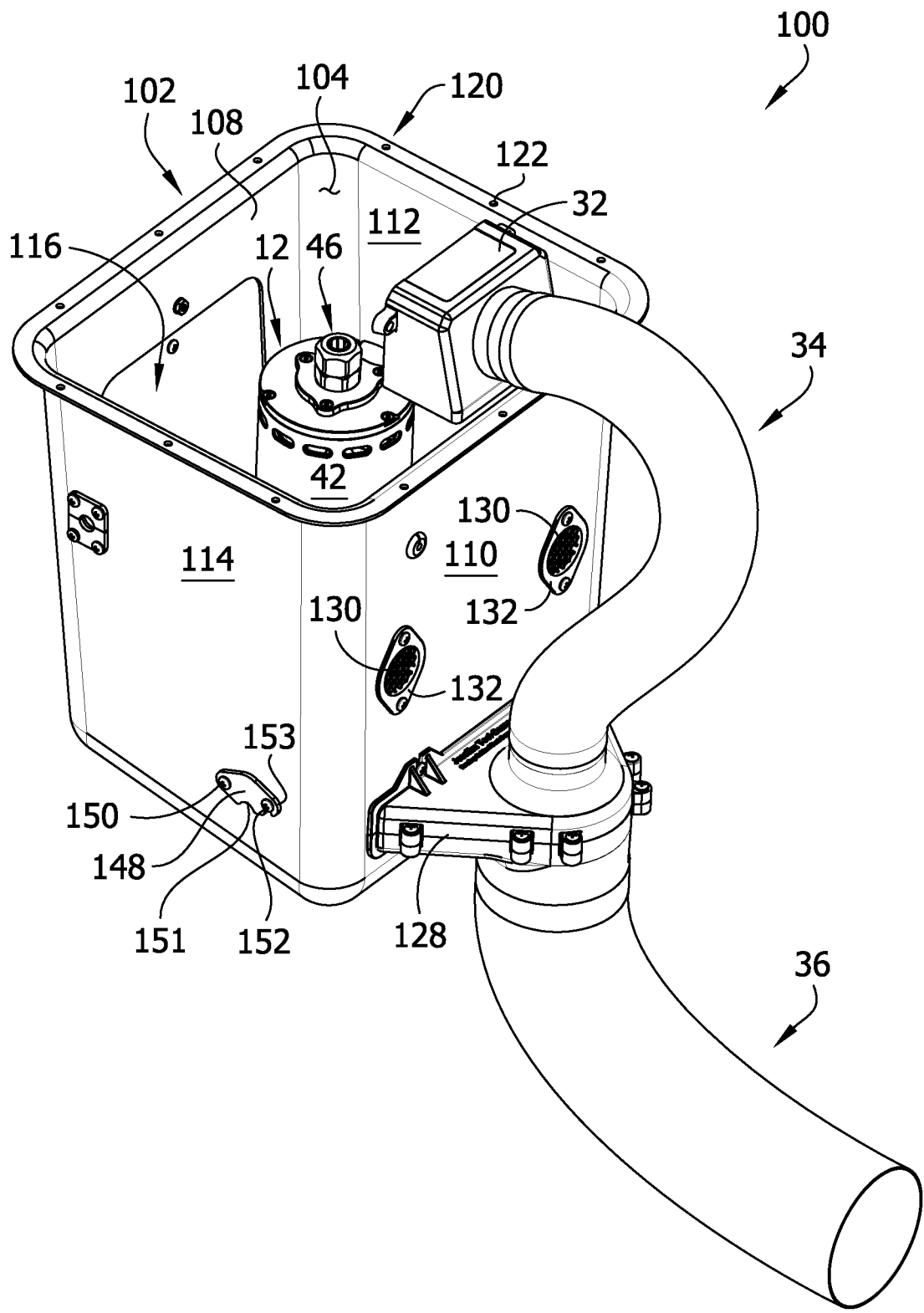
FIG. 3 is a rear perspective of the debris receptacle and a router.

Referring to FIGS. 1, 3 and 5, the enclosure 102 may also define a cable aperture 146 configured to receive the electrical cable 56 of the router 12. The cable aperture 146 is sized and shaped to permit the electrical cable 56 (and the electrical plug at an end thereof) to extend though the side wall 114 and out of the interior 104 to reach an electrical outlet. The enclosure 102 includes a cable door 148 configured to selectively close the cable aperture 146. Preferably, the cable door 148 closes a portion of the cable aperture 146 even when the electrical cable 56 extends through the cable aperture. The cable aperture 146 is larger than the electrical cable 56 to permit the electrical plug of the electrical cable to pass therethough. However, the electrical conduit of the electrical cable 56, which is disposed in the cable aperture 146 once the electrical plug is inserted therethough, is smaller than the cable aperture. This leaves a portion of the cable aperture open. The cable door 148 is able to substantially close this remaining open portion of the cable aperture 146 to prevent debris from passing therethough and out of the interior 104. In the illustrated embodiment, the cable door 148 is rotatably connected to the right side wall 114 of the enclosure by a fastener 150. The cable door 148 can rotate about an axis lying in a generally horizontal plane that extends through the fastener 150. The cable door 148 includes a notch 151 sized and shaped to correspond to the exterior shape of the electrical cable 56. The cable door 148 also includes a rest 153 at one end (opposite the fastener 150) thereof configured to engage and rest on another fastener 152 to position the cable door 148 to close the cable aperture 146 when there is no cable extending therethrough (FIG. 3).

Other configurations of the dust receptacle 100 are within the scope of the present disclosure. For example, in one embodiment (not shown), the dust receptacle 100 can include an air outlet conduit connected to an exhaust port of the router and an air outlet port of the enclosure to exhaust the air that cools the electric motor into the environment outside the dust receptacle. In this embodiment, the air outlet conduit is similar to air intake conduit 140, the exhaust port is similar to cooling air port 54 and the air outlet port is similar to the air intake port 132.

Having described the disclosure in detail, it will be apparent that modifications and variations are possible without departing from the scope of the disclosure defined in the appended claims. For example, where specific dimensions are given, it will be understood that they are exemplary only and other dimensions are possible.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above constructions, products, and methods without departing from the scope of the disclosure, it is intended that all matter contained in the above description and shown in the accompanying drawings shall be interpreted as illustrative and not in a limiting sense.

What is claimed is:

1. A debris receptacle for a router table having a work platform and a router suspended below the work platform, the debris receptacle comprising:
　an enclosure configured to be attached to the router table, the enclosure defining an interior sized and shaped to receive the router to generally enclose the router within the enclosure when the enclosure is attached to the router table, the enclosure defining:
　　a debris inlet aperture in fluid communication with the interior, the debris inlet aperture configured to be in fluid communication with a router bit aperture of the work platform so that the interior receives debris from router bit aperture via the debris inlet aperture;
　　a debris outlet aperture in fluid communication with the interior, the debris outlet aperture configured to be in fluid communication with a dust collector to remove debris from the interior; and
　　an air inlet aperture in fluid communication with air in an environment outside the enclosure; and
　an air intake conduit configured to connect to the router, the air intake conduit defining an air intake passageway configured to be fluidly coupled to the air inlet aperture and configured to be fluidly coupled to an air inlet of the router when the air intake conduit is connected to the router, the air intake conduit enabling the router to draw air into the router from the environment outside the enclosure through the air inlet aperture and the air inlet passageway to cool the router.

2. The debris receptacle of claim 1, wherein the enclosure includes an air inlet port defining the air inlet aperture.

3. The debris receptacle of claim 2, wherein the air inlet port and the air intake conduit are configured to be coupled together to fluidly connect the air inlet aperture to the air intake passageway.

4. The debris receptacle of claim 1, wherein the air inlet aperture is a first air inlet aperture, the air intake conduit is a first air intake conduit, the air intake passageway is a first air intake passageway and the air inlet of the router is a first air inlet of the router, the debris receptacle further comprising:
　a second air inlet aperture defined by the enclosure and in fluid communication with air in the environment outside the enclosure; and
　a second air intake conduit configured to connect to the router, the second air intake conduit defining a second air intake passageway configured to be fluidly coupled to the second air inlet aperture and to a second air inlet of the router when the second air intake conduit is connected to the router, the second air intake conduit enabling the router to draw air into the router from the environment outside the enclosure through the second air inlet aperture and the second air intake passageway to cool the router.

5. The debris receptacle of claim 4, wherein the enclosure includes a first air inlet port defining the first air inlet aperture and a second air inlet port defining the second air inlet aperture.

6. The debris receptacle of claim 5, wherein the first air inlet port and the first air intake conduit are configured to be coupled together to fluidly connect the first air inlet aperture to the first air intake passageway and wherein the second air inlet port and the second air intake conduit are configured to be coupled together to fluidly connect the second air inlet aperture to the second air intake passageway.

7. The debris receptacle of claim 1, wherein the enclosure includes a debris collection port defining the debris outlet aperture, the debris collection port configured to be coupled to a dust collection system to fluidly couple the interior to the dust collection system via the debris outlet aperture.

8. The debris receptacle of claim 7, wherein the debris collection port is configured to couple to a secondary debris collection system so that the secondary debris collection system is fluidly coupled to the dust collection system.

9. The debris receptacle of claim 1, wherein the enclosure includes a bottom wall, the debris outlet aperture disposed adjacent the bottom wall.

10. The debris receptacle of claim 9, wherein the debris outlet aperture is closer to the bottom wall than the air inlet aperture.

11. The debris receptacle of claim 1, wherein the enclosure includes a door configured to permit access to the router when the router is disposed in the interior of the enclosure.

12. The debris receptacle of claim 1, wherein the enclosure defines a cable aperture configured to receive an electrical cable of the router, and comprises a cable door configured to selectively close the aperture.

13. The debris receptacle of claim 1, wherein the enclosure includes a bottom wall, opposite front and rear walls and opposite left and right side walls, the bottom wall of the enclosure slanting downward as the bottom wall extends rearward.

14. The debris receptacle of claim 1, further comprising the router table.

15. The debris receptacle of claim 14, further comprising the router.

* * * * *